United States Patent
Kishore et al.

(10) Patent No.: US 7,801,935 B2
(45) Date of Patent: Sep. 21, 2010

(54) SYSTEM (S), METHOD (S), AND APPARATUS FOR CONVERTING UNSIGNED FIXED LENGTH CODES (DECODED FROM EXPONENTIAL GOLOMB CODES) TO SIGNED FIXED LENGTH CODES

(75) Inventors: Chhavi Kishore, Bangalore (IN); Jagannath Sathyanarayana Shastry, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1484 days.

(21) Appl. No.: 11/095,094

(22) Filed: Mar. 30, 2005

(65) Prior Publication Data
US 2006/0224646 A1    Oct. 5, 2006

(51) Int. Cl.
*G06F 7/00* (2006.01)
*G06K 9/36* (2006.01)

(52) U.S. Cl. .................. 708/203; 708/204; 382/233
(58) Field of Classification Search ............ None
See application file for complete search history.

(56) References Cited

U.S. PATENT DOCUMENTS

| | | | | |
|---|---|---|---|---|
| 6,965,906 B1 * | 11/2005 | Dhablania | ............. | 708/204 |
| 2001/0023425 A1 * | 9/2001 | Oberman et al. | ......... | 708/620 |
| 2003/0133510 A1 * | 7/2003 | Nishikawa et al. | ..... | 375/240.26 |
| 2004/0113914 A1 * | 6/2004 | Rodriguez et al. | ......... | 345/582 |
| 2004/0167953 A1 * | 8/2004 | Shaw | ..................... | 708/508 |
| 2006/0149803 A1 * | 7/2006 | Siu et al. | ................... | 708/501 |

* cited by examiner

*Primary Examiner*—Lewis A Bullock, Jr.
*Assistant Examiner*—Mark A Gooray
(74) *Attorney, Agent, or Firm*—McAndrews Held & Malloy, Ltd.

(57) ABSTRACT

Presented herein are system(s), method(s), and apparatus for converting unsigned fixed length codes to signed fixed length codes. In one embodiment, there is presented a circuit for converting an unsigned code to a signed code. The circuit comprises a multiplexer. The multiplexer comprises a first input, a second input, and an output. The first input receives a first value, the first value being the right shifted unsigned code plus one. The second input receives a second value, the second value being an inverse of a right shifted unsigned code plus one. The output outputs a selected one of the first value received by the first input or the second value received by the second input. The multiplexer selects the selected one of the first value or the second value based on a least significant bit of the unsigned code.

15 Claims, 4 Drawing Sheets

SYSTEM (S), METHOD (S), AND APPARATUS FOR CONVERTING UNSIGNED FIXED LENGTH CODES (DECODED FROM EXPONENTIAL GOLOMB CODES) TO SIGNED FIXED LENGTH CODES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video compression standards use a variety of techniques to compress video data. The techniques include both lossy and lossless compression. The lossy compression takes advantage of spatial and temporal redundancies in the video data. The lossless compression includes variable length coding, including exponential Golomb codes.

During decoding, the foregoing compression techniques are reversed. Part of decoding the variable length codes includes converting decoded exponential Golomb codes from unsigned number to signed number. Decoding video data is preferably done in real time. This requires large numbers of computations to be performed in a short amount of time.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s), method(s), and apparatus for converting unsigned fixed length codes (decoded from Exponential golomb codes) to signed fixed length codes, substantially as shown in and/or described in connection with at least one of the figures, as set forth more completely in the claims.

These and other advantages and novel features of the present invention, as well as details of an illustrated embodiment thereof, will be more fully understood from the following description and drawings.

DETAILED DESCRIPTION OF THE INVENTION

Figure 1:
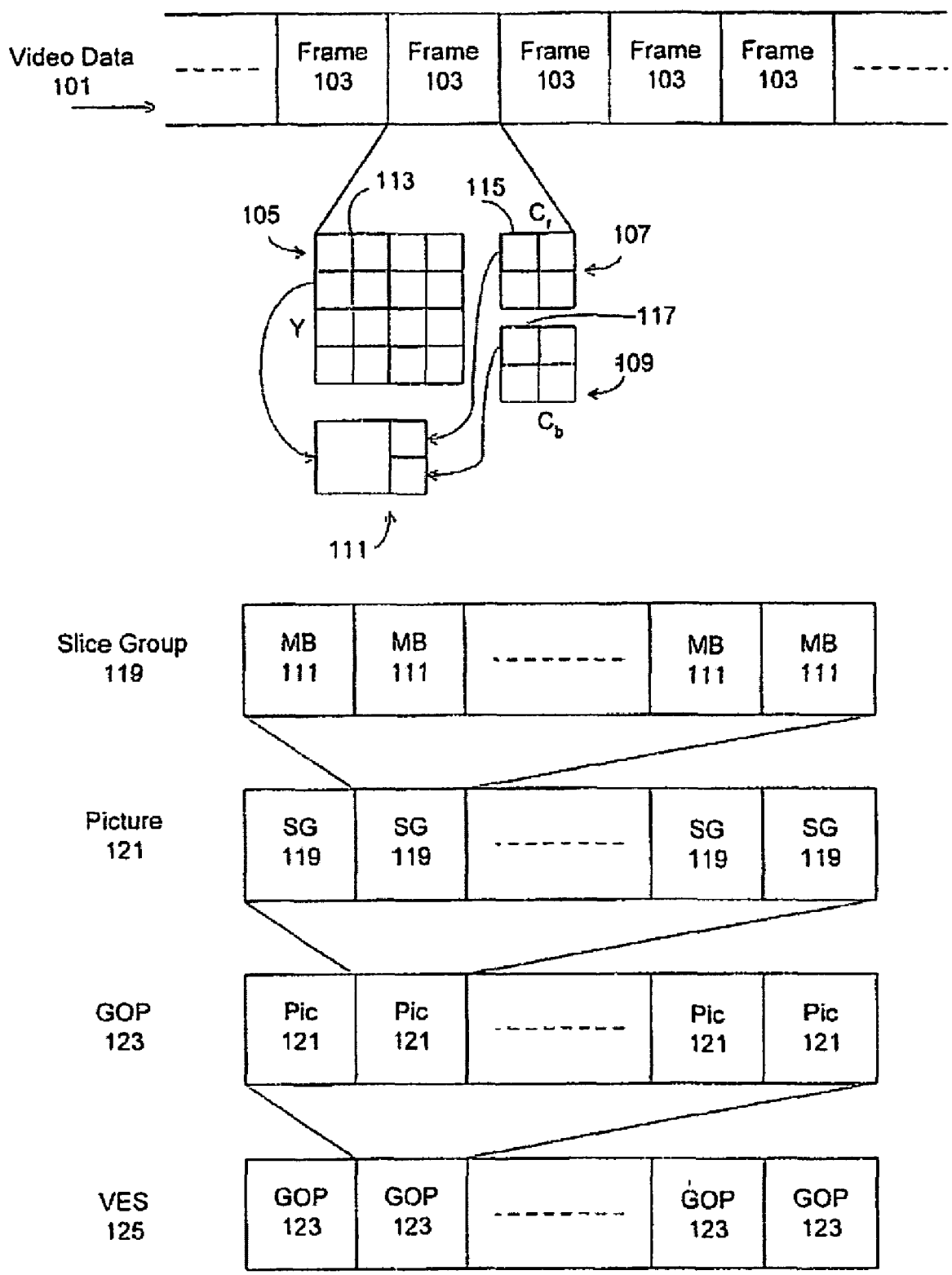
FIG. 1 is a block diagram describing the coding of exemplary video data.

FIG. 1 illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion of a reference frame 103 is found, the differences between the portion of the reference frame 103 and the macroblock 111 are encoded. The location of the portion in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence.

The video elementary stream 125 is also encoded using lossless compression techniques. The lossless compression techniques include variable length coding, including exponential Golomb coding, to code the symbols of the video elementary stream 125.

Figure 2:
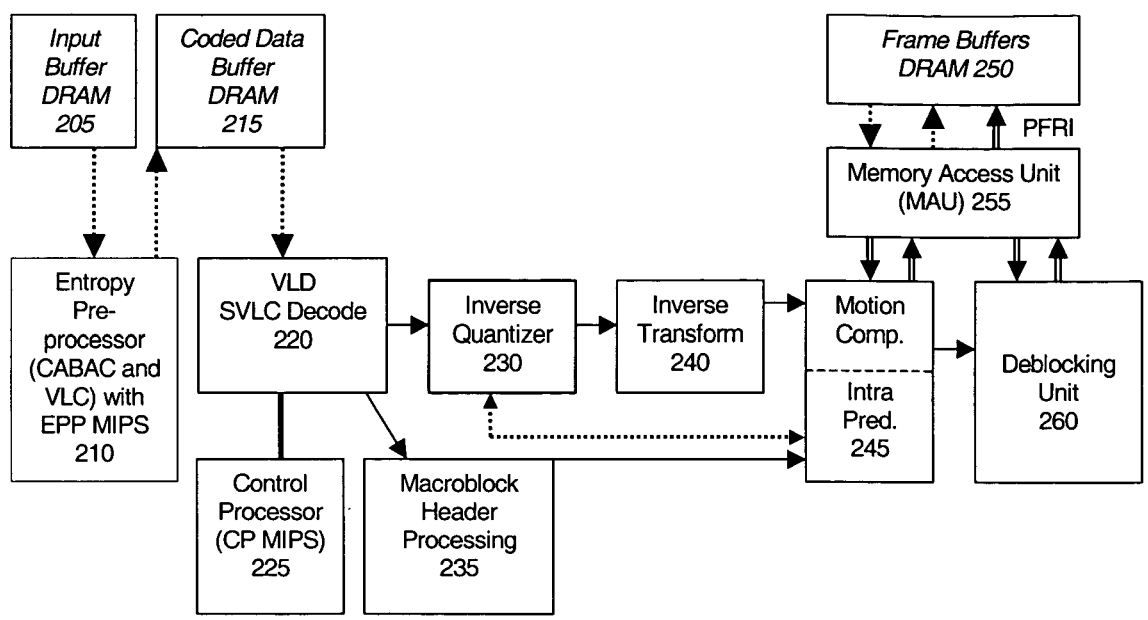
FIG. 2 is a block diagram of a video decoder in accordance with an embodiment of the present invention.

Referring now to FIG. 2, there is illustrated a block diagram describing an exemplary video decoder system 200 in accordance with an embodiment of the present invention. The video decoder 200 comprises an input buffer DRAM 205, an entropy pre-processor 210, a coded data buffer DRAM 215, a variable length code decoder 220, a control processor 225, an inverse quantizer 230, a macroblock header processor 235, an inverse transformer 240, a motion compensator and intrapicture predictor 245, frame buffers 250, a memory access unit 255, and a deblocker 260.

The input buffer DRAM 205, entropy pre-processor 210, coded data buffer DRAM 215, and variable length code decoder 220 together decode the variable length coding associated with the video data, resulting in pictures 100 represented by macroblocks 120.

The inverse quantizer 230 inverse quantizes the macroblocks 120, resulting in sets of frequency coefficients. The macroblock header processor 235 examines side information, such as parameters that are encoded with the macroblocks 120. The inverse transformer 240 transforms the frequency coefficients, thereby resulting in the prediction error. The motion compensator and intrapicture predictor 245 decodes the macroblock 120 pixels from the prediction error. The decoded macroblocks 120 are stored in frame buffers 250 using the memory access unit 255. A deblocker 260 is used to deblock adjacent macroblocks 120.

The variable length decoder 220 decodes the exponential Golomb codes. The decoding of exponential golomb codes includes converting the exponential Golomb codes to unsigned fixed length codes followed by conversion of unsigned fixed length code to signed fixed length code. An unsigned fixed length code (k) is converted to a signed code (A), by the following formula:

$$A=(-1)^{k+1} \text{ceil}(k/2)$$

ceil (k/2) is
   if the last bit of k is 1, (k−1)/2+1
   if the last bit of k is 0, k/2
$(-1)^{k+1}$ is
   1 if the last bit of k is 1
   −1 if the last bit of k is 0

Thus
A=k right-shifted by one +1 if last bit of k=1
  =Inverse of k right shifted by one +1 if last bit of k=0

Figure 3:
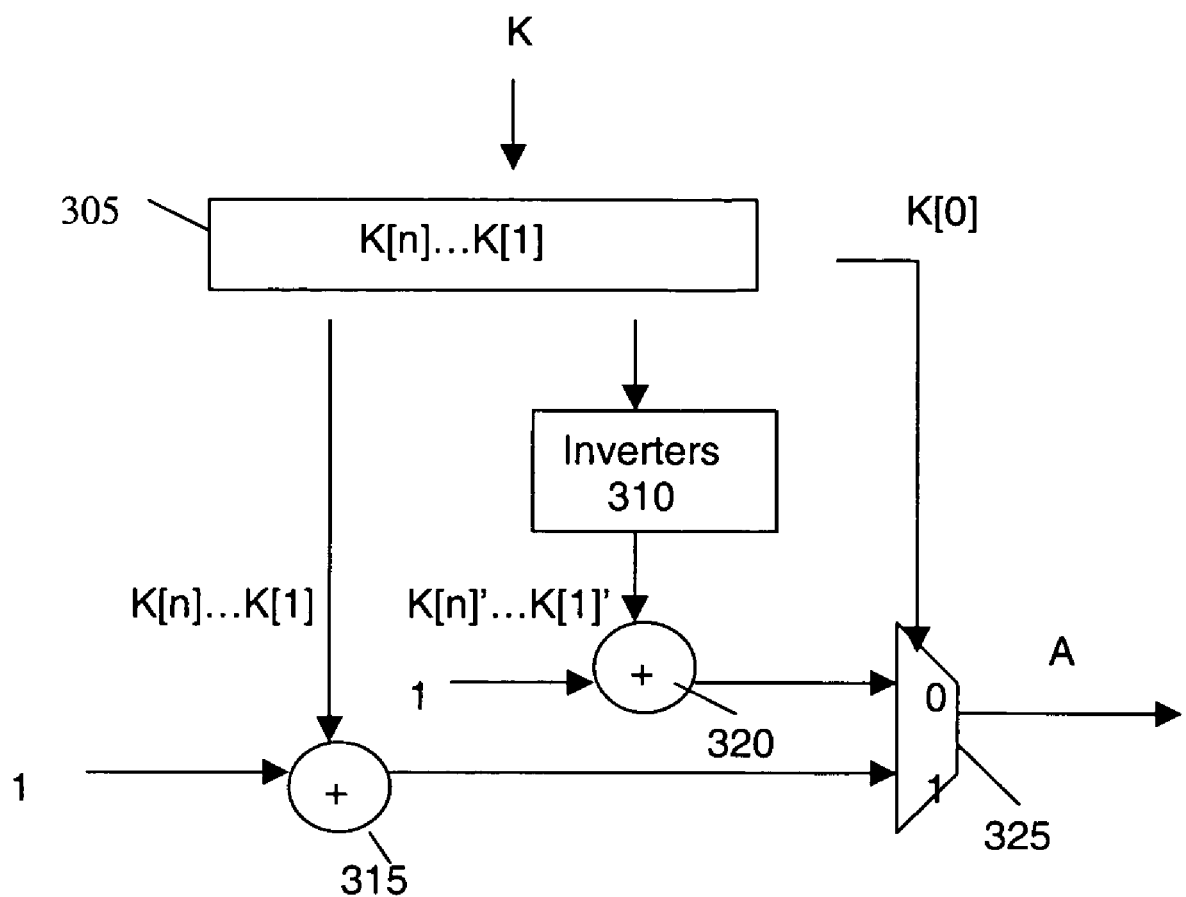
FIG. 3 is a block diagram of a variable length decoder in accordance with an embodiment of the present invention.

Referring now to FIG. 3, there is illustrated a block diagram of an exemplary variable length decoder in accordance with an embodiment of the present invention. The variable length decoder 220 comprises a register 305, an inverter 310, a first adder 315, a second adder 320, and a multiplexer 325.

The register 305 receives and right shifts an n-bit unsigned fixed length code k. The register 305 shifts out the least significant bit of the unsigned fixed length code k to the multiplexer 325. The inverter 310 and first adder 315 receive the contents of the register 305, k[n:1]. The inverter 310 inverts each bit of k[n:1]. The first adder 315 adds one to the contents of the register k[n:1]. The second adder 320 receives the contents of the inverter 310 and adds one to the contents of the inverter 310.

The multiplexer 325 receives and selects between the outputs of the first adder 315 and the second adder 320. The multiplexer 325 also receives the least significant bit of the unsigned fixed length code. The least significant bit of the unsigned fixed length code controls the selection of the multiplexer 325. If the least significant bit is a zero, the multiplexer 325 selects the output of the second adder. If the least significant bit is a one, the multiplexer 325 selects the output of the first adder.

Figure 4:
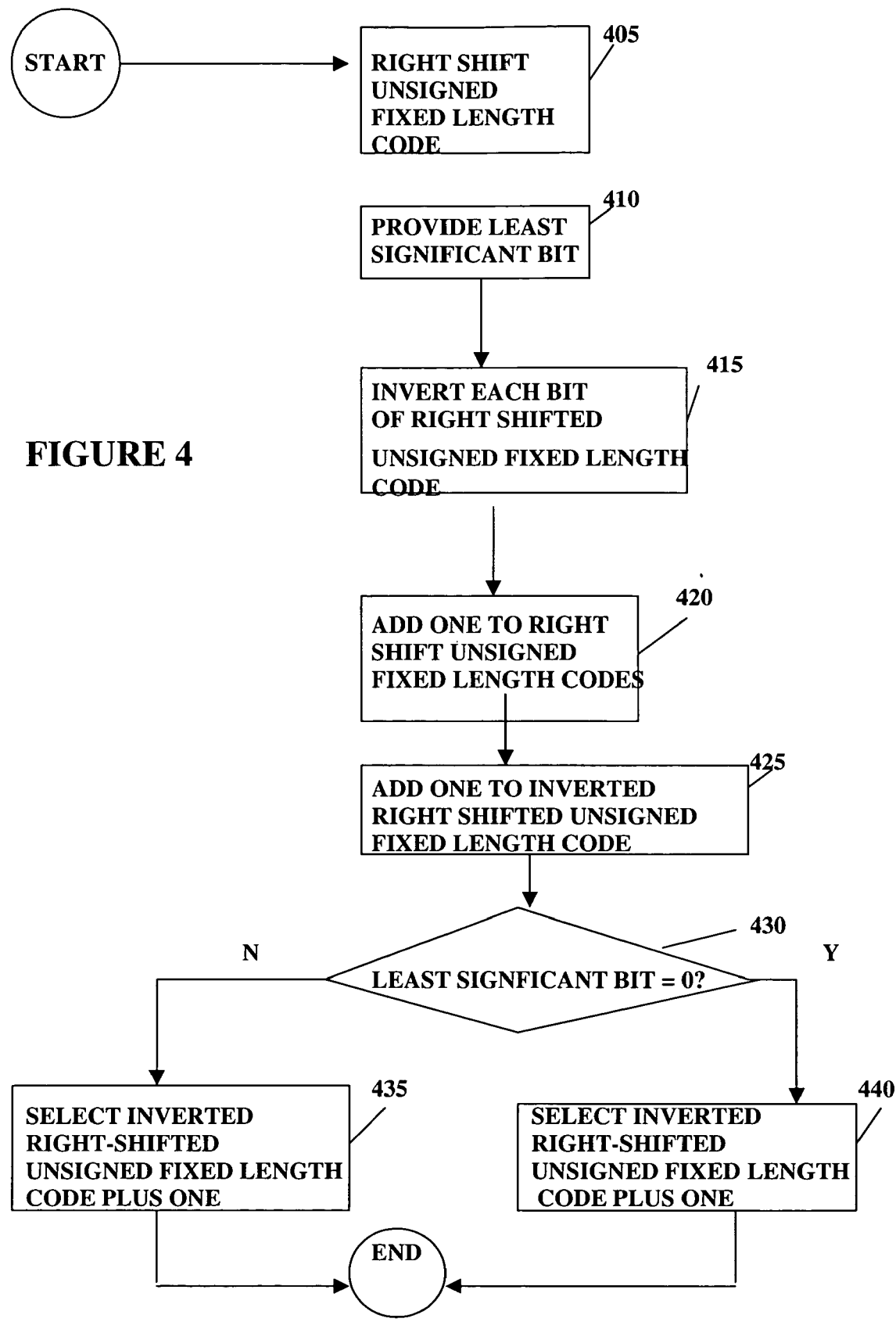
FIG. 4 is a flow diagram for converting an unsigned fixed length code to a signed fixed length code in accordance with an embodiment of the present invention.

Referring now to FIG. 4, there is illustrated a block diagram of an exemplary variable length decoder in accordance with an embodiment of the present invention. At 405, the register 305 receives and right shifts an n-bit unsigned fixed length code k. The register 305 shifts out the least significant bit of the unsigned fixed length code k and provides (410) it to the multiplexer 325. The inverter 310 and first adder 315 receive the contents of the register 305, k[n:1]. The inverter 310 inverts (415) each bit of k[n:1]. The first adder 315 adds (420) one to the contents of the register k[n:1]. The second adder 320 receives the contents of the inverter 310 and adds one (425) to the contents of the inverter 310.

The multiplexer 325 receives and selects between the outputs of the first adder 315 and the second adder 320. The multiplexer 325 also receives the least significant bit of the unsigned fixed length code. The least significant bit of the unsigned fixed length code controls the selection of the multiplexer 325. If at 430, the least significant bit is a zero, the multiplexer 325 selects (435) the output of the second adder. If at 430, the least significant bit is a one, the multiplexer 325 selects (440) the output of the first adder.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor. In one representative embodiment, the encoder or decoder can be implemented as a single integrated circuit (i.e., a single chip design).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. For example, although the embodiments have been described with a particular emphasis on the MPEG-2 standard, the teachings of the present invention can be applied to many other standards without departing from it scope. Therefore, it is intended that the present invention not be limited to the particular embodiment disclosed, but that the present invention will include all embodiments falling within the scope of the appended claims.

The invention claimed is:

1. A circuit for decoding encoded video data, said circuit comprising:
   a variable length decoder for decoding variable length coded data, said variable length decoder comprising:
     a multiplexer comprising:

a first input for receiving a first value, the first value being a right shifted unsigned code plus one;

a second input for receiving a second value, the second value being an inverse of a right shifted unsigned code plus one; and an output for outputting a selected one of the first value received by the first input or the second value received by the second input; and a circuit for decoding the video data based on the decoded variable length coded data and writing the video data to a memory.

2. The circuit of claim 1, further comprising:

a register for right-shifting the unsigned code, thereby resulting in a right-shifted unsigned code.

3. The circuit of claim 2, wherein the register provides the least significant bit of the unsigned code to the multiplexer.

4. The circuit of claim 2, further comprising:

an inverter for inverting the right-shifted unsigned code, thereby resulting in an inverted right-shifted unsigned code.

5. The circuit of claim 4, further comprising:

a first adder for adding one to the right-shifted unsigned code, thereby providing the right-shifted unsigned code plus one.

6. The circuit of claim 5, further comprising:

a second adder for adding one to the inverted right-shifted unsigned code, thereby providing the inverted right-shifted unsigned code plus one.

7. A circuit for decoding encoded video data, said circuit comprising:

a variable length decoder, said variable length decoder further comprising:

a multiplexer comprising:

a first input operable to receive a first value, the first value being a right shifted unsigned code plus one;

a second input operable to receive a second value, the second value being an inverse of a right shifted unsigned code plus one; and an output operable to output a selected one of the first value received by the first input or the second value received by the second input; and wherein said multiplexer is operable to select the selected one of the first value or the second value based on a least significant bit of the unsigned code; and an inverse quantizer connected to the variable length decoder;

an inverse transformer connected to the inverse quantizer; and a motion compensator coupled to the inverse transformer.

8. The circuit of claim 7, further comprising:

a register connected to the multiplexer, the register operable to right-shift the unsigned code, thereby resulting in a right-shifted unsigned code.

9. The circuit of claim 8, wherein the register is operable to provide the least significant bit of the unsigned code to the multiplexer.

10. The circuit of claim 8, further comprising:

an inverter connected to the register, the inverter operable to invert the right-shifted unsigned code, thereby resulting in an inverted right-shifted unsigned code.

11. The circuit of claim 10, further comprising:

a first adder operably connected to the register to add one to the right-shifted unsigned code, and further operably connected to the first input to provide the right-shifted unsigned code plus one to the first input.

12. The circuit of claim 11, further comprising:

a second adder operable connected to the inverter to add one to the inverted right-shifted unsigned code, and operably connected to the second input to provide the inverted right-shifted unsigned code plus one to the second input.

13. A method comprising:

receiving a right-shifted unsigned code plus one;

receiving an inverted right-shifted unsigned code plus one; and selecting one of the right-shifted unsigned code plus one or the inverted right-shifted unsigned code plus one, based on a least significant bit of the unsigned code; and decoding video data based at least in part on the selection.

14. The method of claim 13, further comprising:

right-shifting the unsigned code, thereby resulting in a right-shifted unsigned code;

adding one to the right-shifted unsigned code, thereby resulting in the right-shifted unsigned code plus one;

inverting the right-shifted unsigned code, thereby resulting in an inverted right-shifted unsigned code; and adding one to the inverted right-shifted unsigned code, thereby resulting in the inverted right-shifted unsigned code plus one.

15. The circuit of claim 3, wherein the register provides only the least significant bit, and wherein the multiplexer selects entirely based on the least significant bit.

* * * * *

UNITED STATES PATENT AND TRADEMARK OFFICE
CERTIFICATE OF CORRECTION

| | | |
|---|---|---|
| PATENT NO. | : 7,801,935 B2 | Page 1 of 1 |
| APPLICATION NO. | : 11/095094 | |
| DATED | : September 21, 2010 | |
| INVENTOR(S) | : Kishore et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this
Fourth Day of October, 2011

David J. Kappos
*Director of the United States Patent and Trademark Office*